(12) United States Patent
Reshetov (10) Patent No.: US 7,414,624 B2
(45) Date of Patent: Aug. 19, 2008

(54) APPARATUS AND METHOD FOR A FRUSTUM CULLING ALGORITHM SUITABLE FOR HARDWARE IMPLEMENTATION

(75) Inventor: Alexander V. Reshetov, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 11/262,168

(22) Filed: Oct. 28, 2005

(65) Prior Publication Data

US 2007/0097118 A1    May 3, 2007

(51) Int. Cl.
  *G06T 15/40* (2006.01)
(52) U.S. Cl. .................. 345/421; 345/422; 345/427
(58) Field of Classification Search .............. 345/421, 345/422, 427
  See application file for complete search history.

(56) References Cited

U.S. PATENT DOCUMENTS 5,579,455 A * 11/1996 Greene et al. .............. 345/422

OTHER PUBLICATIONS

Assarsson, Ulf, et al., "Optimized View Frustum Culling Algorithms for Bounding Boxes,:" *Journals of Graphics Tools*, Feb. 2000, 10 pp.*

Sykora, Daniel, et al., "Efficient View Frustum Culling," Czech Technical Univ., 13 pp., downloaded from http://www.cg.tuwien.ac.at/studentwork/CESCG/CESCG-2002/DSykoraJJelinek.*

* cited by examiner

*Primary Examiner*—Kimbinh T Nguyen
(74) *Attorney, Agent, or Firm*—Blakely, Sokoloff, Taylor & Zafman LLP (57) ABSTRACT

A method and apparatus for a frustum culling algorithm suitable for hardware implementation. In one embodiment, the method includes the separation of coordinates of a normal vector of each frustum plane of a frustum view into positive normal coordinates and negative normal coordinates. In one embodiment, the separation of the coordinates of each normal vector of the frustum planes enables implicit selection of the coordinates of a negative vertex (N-vertex) of an axis-aligned bounded box (AABB). Once implicitly selected, it is determined whether the N-vertex of the AABB is outside at least one frustum plane. In one embodiment, a determination that the N-vertex of the AABB is outside at least one of the frustum planes provides a trivial reject of objects enclosed by the AABB that are therefore is excluded from the rendering process. Other embodiments are described and claimed.

17 Claims, 11 Drawing Sheets

APPARATUS AND METHOD FOR A FRUSTUM CULLING ALGORITHM SUITABLE FOR HARDWARE IMPLEMENTATION

FIELD

One or more embodiments relate generally to the field of computer graphics. More particularly, one or more of the embodiments relate to a method and apparatus for a frustum culling algorithm suitable for hardware implementation.

BACKGROUND

The frustum culling algorithms for axis-aligned bounded boxes (AABB) were first developed in the context of traditional raster graphics. Here, simple tests are used on proxies for detailed geometries to purge objects, which do not intersect the frustum, effectively reducing the amount of geometric objects submitted for rendering. These tests are designed to quickly detect a majority of cases where objects do not intersect with the frustum view. The objects are trivially rejected when their AABBs can be separated from the frustum by one of the frustum planes. Current best-known software implementations of this algorithm are summarized in Assarsson, U. and Moller, T., "Optimized View Frustum Culling Algorithms for Bounding Boxes," Journal of Graphics Tools, 5(1), pp. 2-22, 2500.

The best-known method (BKM) for frustum culling requires computing indices into a look-up table to read vertex coordinates of either a vertex laying farthest in the negative direction of a frustum plane normal (N-vertex) or a positive vertex (P-vertex) of an AABB, which are then inserted into plane equations to determine the position of the AABB with respect to the particular frustum plane. Conventionally, such a method is implemented on add-in graphics cards (GPU). Unfortunately, access to an external look-up table, to determine coordinates of either an N-vertex or a P-vertex of an AABB can make conventional frustum culling algorithms inefficient.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for a frustum culling algorithm suitable for hardware implementation are described. In one embodiment, the method includes the separation of coordinates of a normal vector of each frustum plane of a frustum view into positive normal coordinates and negative normal coordinates. In one embodiment, the separation of the coordinates of each normal vector of the frustum planes enables implicit selection of the coordinates of a vertex of an axis-aligned bounded box (AABB), laying farthest in the negative direction of the normal ("N-vertex"). Once the coordinates of the N-vertex of the AABB are implicitly selected, it may be determined whether the N-vertex of the AABB is outside at least one frustum plane. In one embodiment, a determination that the N-vertex of the AABB is outside one of the frustum planes provides a trivial reject of objects enclosed by the AABB, such that the objects result in a "trivial reject," which is referred herein as one or more objects that are found to be outside at least one of the frustum planes of a frustum view and therefore is excluded from the rendering process.

System

Figure 1:
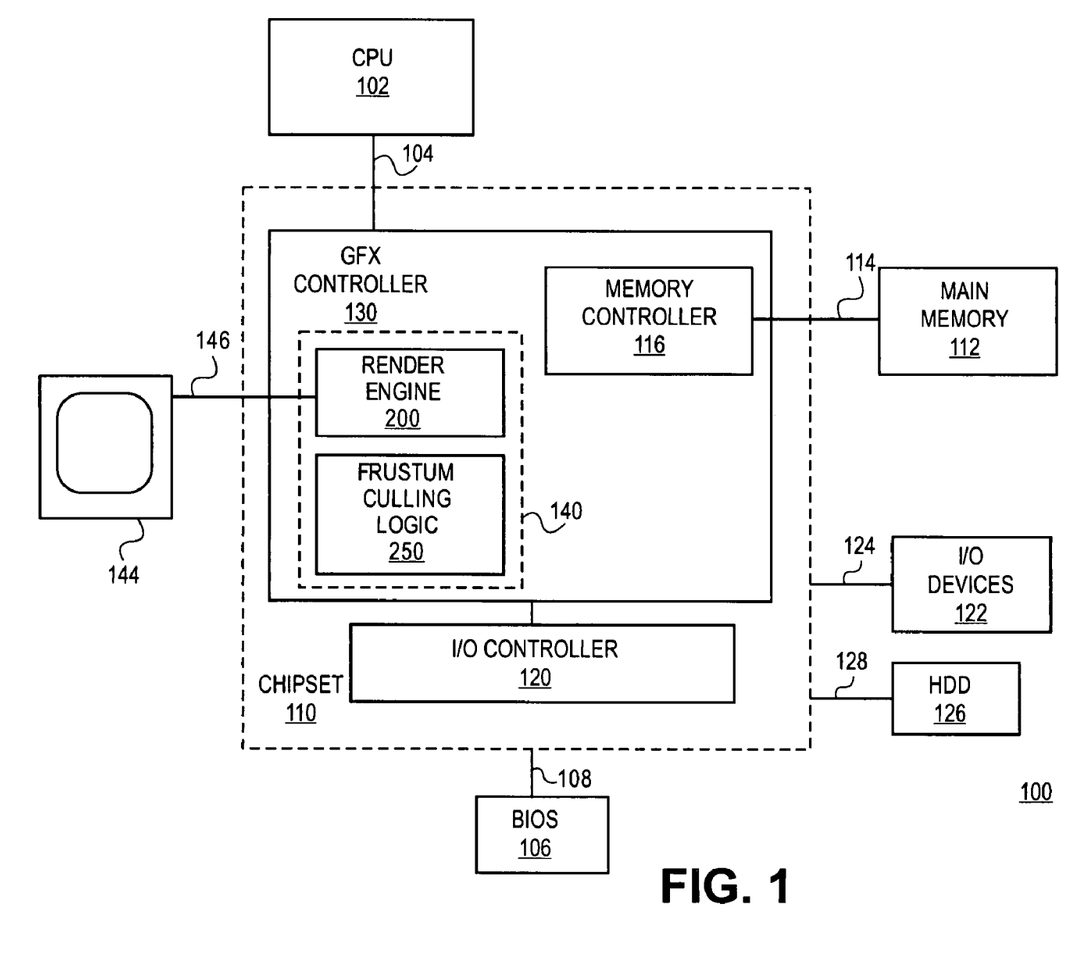
FIG. 1 is a block diagram illustrating a computer system including frustum culling logic, in accordance with one embodiment.

FIG. 1 is a block diagram illustrating computer system 100 including frustum culling logic 250, in accordance with one embodiment. Representatively, computer system 100 comprises a processor system bus 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include an integrated graphics (GFX) controller 130 having integrated memory controller (MC) 116. In one embodiment, GFX controller 130 operates as an integrated graphics memory controller (GMC), and is coupled to display 144 via interconnect 146. In an alternative embodiment, graphics controller 130 is coupled to chipset 110 and separate from MC 116, such that chipset 110 includes a memory controller (MC) 116 separate from GFX controller 130. Representatively, MC 116 is also coupled to main memory 112 via interconnect 114. In one embodiment, main memory 114 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller (IOC) 120. Representatively, IOC 120 may include a universal serial bus (USB) link or interconnect 124 to couple one or more I/O devices to IOC 120. In one embodiment, interconnect 200 operates according to a point-to-point link protocol including peripheral component interconnect (PCID express (PCI-Express) protocol, or other like point-to-point interconnect protocol. Likewise, a serial advance technology attachment (SATA) 128 may couple hard disk drive devices (HDD) 126 to IOC 120. In one embodiment, basic input/output system (BIOS) 106 initializes computer system 100. Although chipset 110 is illustrated as including a separate GMC 130 and IOC 120, in one embodiment, GMCH 130 may be integrated within CPU 102 to provide, for example, a system on chip (SOC). In an alternate embodiment, the functionality of GMC 116 and IOC 120 are integrated within chipset 110.

In one embodiment, frustum logic 250 may be implemented within computer systems including an MC integrated within a CPU, an MC and IOC integrated within a chipset, as well as a system on-chip. Accordingly, those skilled in the art recognize that FIG. 1 is provided to illustrate one embodiment and should not be construed in a limiting manner. In one embodiment, GFX controller 130 includes video controller 140 for displaying data on display 144.

Representatively, video controller 140 may include a render engine 200 to render data received from frustum culling logic 250 to enable display of such data. Accordingly, in the embodiments described herein, system 100 provides geometry processing, such as performed by video controller 140 and graphics controller 130, which in contrast to conventional systems is not performed by an add-in graphics card (GPU). As is further described herein, a new version of a traditional frustum culling algorithm is implemented using single instruction multiple data (SIMD) registers, as described in further detail below.

Figure 2:
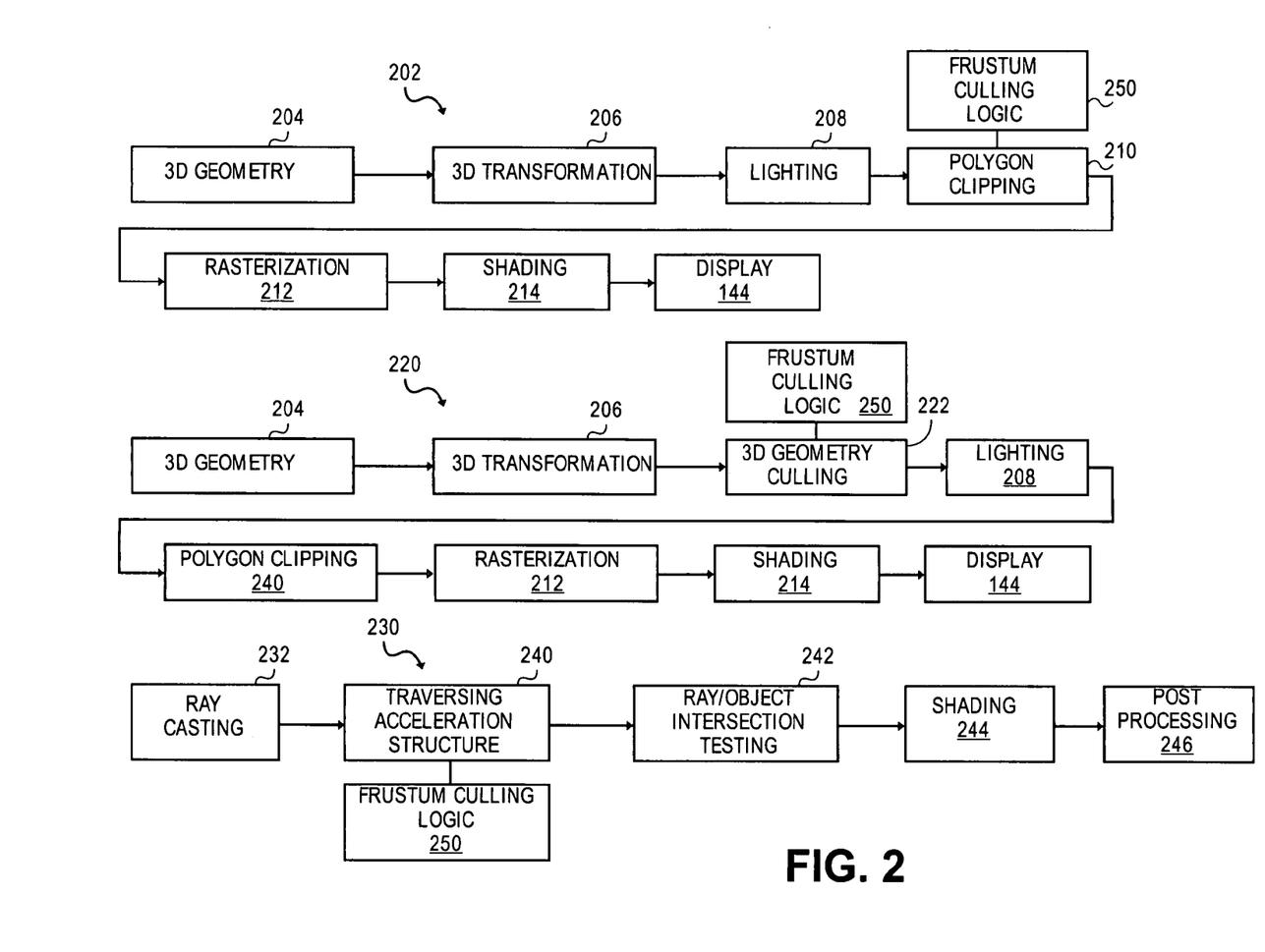
FIG. 2 is a block diagram further illustrating the render engine of FIG. 1, in accordance with one embodiment.

FIG. 2 is a block diagram further illustrating render engine 200, as shown in FIG. 1, in accordance with one embodiment. Representatively, render engine 200, in one embodiment, provides rendering pipeline 202, in accordance with one embodiment. Representatively, rendering pipeline 202 includes the following pipeline stages: (1) three-dimensional (3D) geometry stage, which receives data submitted for rendering; (2) 3D transformation stage 204; (3) lighting stage 206; (4) polygon clipping stage 210; (5) rasterization stage 212; and (6) shading stage 214, which provides a two-dimensional image for display on screen to display 144. In one embodiment, frustum culling logic 250 may be used as part of polygon clipping stage 210 to reduce the number of polygons submitted for rasterization (rasterization stage 212.)

As further illustrated in FIG. 2, rendering engine 200 may implement rendering pipeline 220, in accordance with one embodiment. In accordance with the embodiment of rendering pipeline 220, frustum culling logic 250 may be used to purge chunks of 3D geometry by culling appropriate axis-aligned bounded boxes (AABB) against a frustum view, as described in further detail below. Representatively, a 3D geometry culling stage 222 is added between 3D transformation stage 206 and lighting stage 208. As will be recognized, rendering pipeline 220 contains the same stages as rendering pipeline 202, with the distinction being the 3D geometry culling stage 222, which is inserted between 3D transformation stage 206 and lighting stage 208.

FIG. 2 further illustrates ray tracing pipeline 230, which may be implemented by render engine 200, in accordance with one embodiment. Representatively, ray tracing pipeline includes the following stages: (1) ray caching stage 232; (2) traversing acceleration structure stage 240; (3) ray/object intersection testing stage 242; (4) shading stage 244; and (5) post-processing stage 246. In the embodiment illustrated, frustum culling logic 250 can be used at the traversing acceleration structure stage 240. In one embodiment, traversing acceleration structure stage 240 may be used to identify objects, which can potentially intersect with given rays.

In one embodiment, frustum culling logic 250 may be used to cull one or more such objects to reduce the number of objects that are submitted for intersection tests. In one embodiment, implementing the various stages of rendering pipelines 202 and 220, as well as ray tracing pipeline 230 in hardware, implementation of frustum culling logic 250 is provided as hardware support for executing certain application-specific programs. For rasterizing hardware, frustum culling logic 250 may be implemented within vertex and pixel shaders. Therefore, in one embodiment, frustum culling logic 250 may be implemented as fixed function logic and expose an instruction set for appropriate stages of rendering pipelines, ray tracing pipelines, or the like.

In one embodiment, frustum culling logic may also be implemented within a CPU, such as CPU 102, as shown in FIG. 1, in the form of a specialized operation implemented on die. Accordingly, the various stages of rendering in ray tracing pipelines, as shown in FIG. 2, may be implemented in software or hardware, while remaining within the scope of the described embodiments. Further details regarding the rendering pipeline implemented by, for example, rendering engine 200, are omitted to avoid obscuring details of the described embodiments. Accordingly, frustum culling logic 250, in one embodiment, may be implemented as fixed function logic and exposed in an instruction set for the appropriate stage of a rendering pipeline, ray tracing pipeline or other like pipeline for the processing of video data for display.

Figure 3:
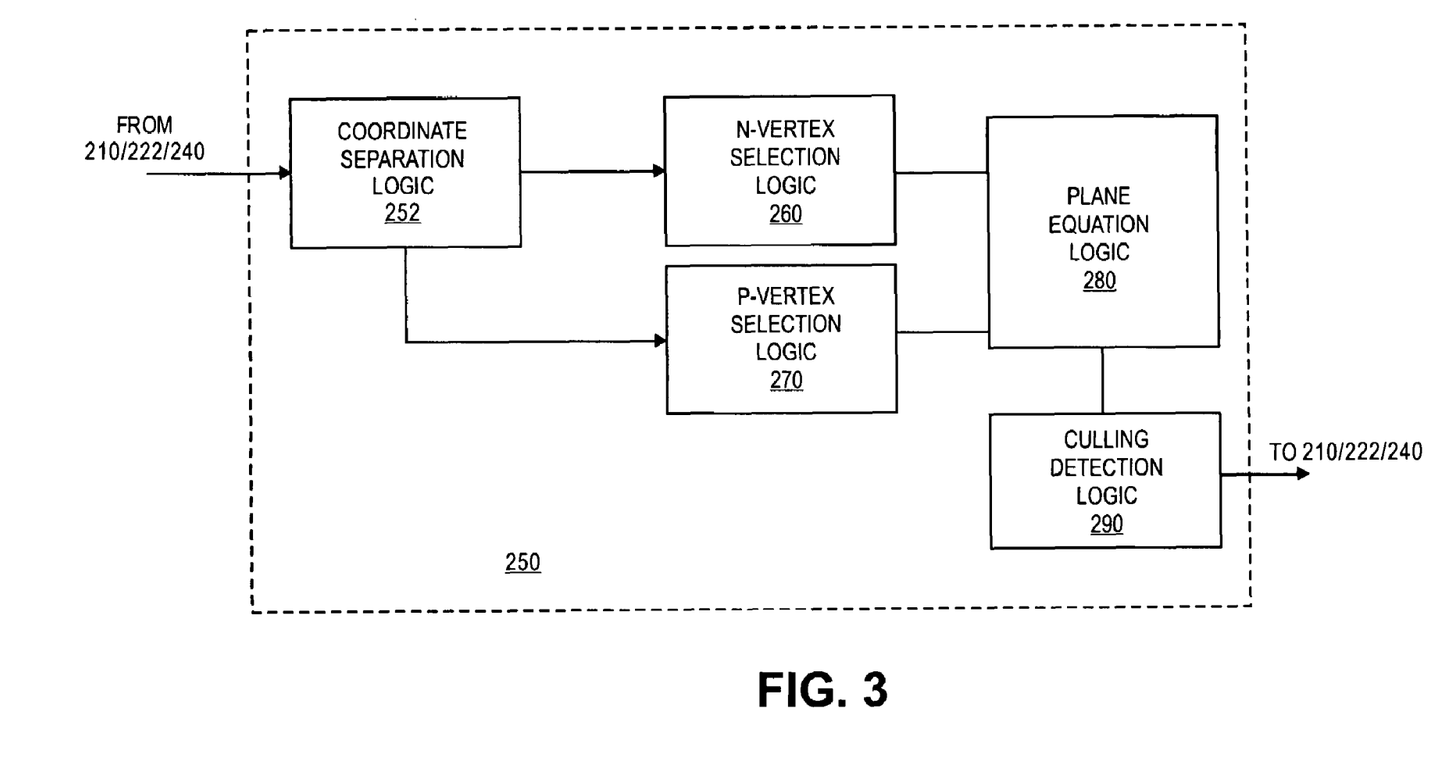
FIG. 3 is a block diagram further illustrating the frustum culling logic of FIG. 1, in accordance with one embodiment.
Figure 4:
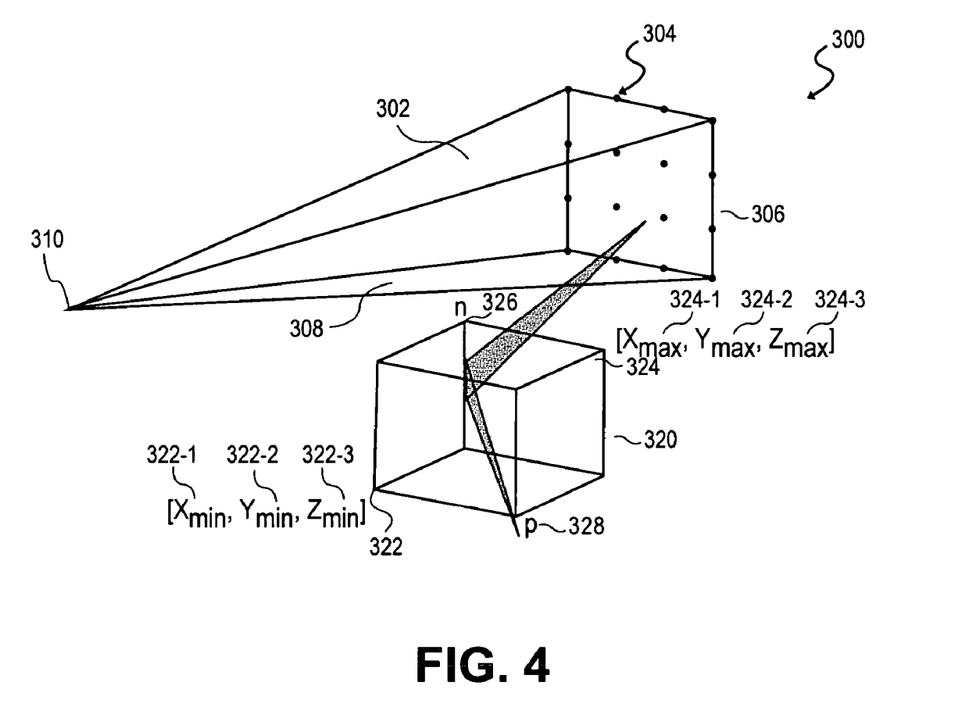
FIG. 4 is a block diagram illustrating a frustum view in combination with an axis-aligned bounded box (AABB), in accordance with one embodiment.

FIG. 3 is a block diagram further illustrating frustum culling logic 250 of FIG. 1, in accordance with one embodiment. Representatively, frustum culling logic 250 may include coordinate separation logic 252 for separating positive and negative coordinates of each normal vector of, for example, the four frustum planes (302, 304, 306 and 308) of frustum 300, as shown in FIG. 3. In one embodiment, separation of the positive and negative coordinates of each normal vector of the frustum planes, as shown in FIG. 4, enables the implicit selection of a negative vertex (N-vertex) as performed by N-vertex selection logic 260. As described herein, "to implicitly select coordinates" refers to the determination of such coordinates values without reference to a look-up table. Likewise, this coordinate separation enables the implicit selection of a vertex laying farthest in the positive direction of a frustum plane normal ("P-vertex") by, for example, P-vertex selection logic 270. As described herein, "to explicitly select coordinates" refers to the determination of such coordinates values with reference to a look-up table.

FIG. 4 is a block diagram illustrating a frustum view 300, which is comprised of a top plane 304, a bottom plane 308, a left plane 302 and a right plane 306, which may be referred to herein as a "frustum view". Representatively, each plane is defined by an intersection point 310 and a normal (not shown), which may be considered as pointing outward from frustum view 300. A frustum culling algorithm is generally used to determine whether a plane (302-308) of frustum view 300 intersects with a given axis-aligned bounded box (AABB) 320. For each frustum plane (302, 304, 306, 308), there are two vertices of interest belonging to AABB 320: (1) the one lying farthest in the positive direction of the planes normal (P-vertex) 328; and (2) the other lying farthest in a negative direction of the normal (N-vertex) 326.

Conventionally, by inserting coordinates of the N-vertex 326 into a plane equation, it can be determined whether N-vertex 326, and therefore, AABB 320 is located "outside" a respective plane of frustum view 300. Conventionally, determination of the coordinates of N-vertex 326 is performed by access to a look-up table, as shown in Table 1, according to a sign (+/−) of respective normal vector (Nx, Ny, Nz) of the frustum plane. This process is repeated for each plane of frustum view 300 to determine whether AABB 320 is located outside at least one plane of frustum view 300. When such is the case, a "trivial reject" is detected, such that AABB 320 can be separated from frustum view 300 by at least one of the frustum planes (302-308). In addition, P-vertex 328 may be used to determine whether or not the entire AABB 320 is completely inside frustum view 300.

TABLE 1

| $n_x$ | $n_y$ | $n_z$ | p-vertex | n-vertex |
|---|---|---|---|---|
| + | + | + | [$x_{max}$, $y_{max}$, $z_{max}$] | [$x_{min}$, $y_{min}$, $z_{min}$] |
| + | + | − | [$x_{max}$, $y_{max}$, $z_{min}$] | [$x_{min}$, $y_{min}$, $z_{max}$] |
| + | − | + | [$x_{max}$, $y_{min}$, $z_{max}$] | [$x_{min}$, $y_{max}$, $z_{min}$] |
| + | − | − | [$x_{max}$, $y_{min}$, $z_{min}$] | [$x_{min}$, $y_{max}$, $z_{max}$] |
| − | + | + | [$x_{min}$, $y_{max}$, $z_{max}$] | [$x_{max}$, $y_{min}$, $z_{min}$] |
| − | + | − | [$x_{min}$, $y_{max}$, $z_{min}$] | [$x_{max}$, $y_{min}$, $z_{max}$] |
| − | − | + | [$x_{min}$, $y_{min}$, $z_{max}$] | [$x_{max}$, $y_{max}$, $z_{min}$] |
| − | − | − | [$x_{min}$, $y_{min}$, $z_{min}$] | [$x_{max}$, $y_{max}$, $z_{max}$] |

In contrast to conventional frustum culling algorithms, which require access to a look-up table, such as shown in Table 1 above, frustum culling logic 250, as shown in FIG. 3, enables implicit selection of N-vertex and P-vertex coordinate values, for example, as shown in Table 1, by separating the coordinates of each normal vector of each frustum plane into positive and negative coordinates. Hence, such implicit selection enables the usage of N-vertex and P-vertex without accessing a look-up table. In contrast, conventional frustum culling logic determines such N-vertex and P-vertex values by performing access to a look-up table, which incurs a processor-to-memory bottlenecks that greatly reduce the efficiency of conventional frustum culling algorithms.

Accordingly, referring again to FIG. 3, based on such implicit selection, plane equation logic 280 may be used to form a plane equation according to the positive and negative coordinates of each normal vector, as well as the coordinates of either the N-vertex or the P-vertex to form one or more equations to enable parallel computation for each of the Frustum planes by, for example, culling detection logic 290 to determine whether objects within an axis-aligned bounded box are outside the frustum view.

As shown in FIG. 3, plane equation logic forms a plane equation as follows:

$$n*x+d=0 \quad (1)$$

As described in plane Eq. (1), the variable n is the plane normal vector and may be defined as follows:

$$n=[n_x, n_y, n_z] \quad (2)$$

As indicated by the plane normal n, x is an arbitrary point inside the plane. In one embodiment, the direction of the plane normal n is chosen in such a way that for all points y outside the frustum view, the following equation is true:

$$n*y+d>0 \quad (3)$$

Accordingly, once the plane equation is formed, for example, as described by Eq. (1), culling detection logic 290 may compute the plane equation and determine whether objects enclosed by an AABB, such as AABB 320, as shown in FIG. 4, is outside at least one frustum plane of frustum view, for example, as shown in FIG. 4. In one embodiment, AABB 320, as shown in FIG. 4, may be represented as two 3D vectors: (1) [Xmin, Ymin, Zmin] for minimum coordinate vertex 322; and [Xmax, Ymax, Zmax] for maximum coordinate vertex 324 of AABB 320. As is described below, Table 2 depicts one possible implementation as performed by frustum culling logic 250, as shown in FIG. 3, to enable parallel computation for determining whether an AABB, such as shown in FIG. 4, is outside one frustum plane of a frustum view.

In the embodiment illustrated in FIG. 3, a special case is illustrated where frustum view 300, for example, as shown in FIG. 4, is formed by exactly four planes (302-308), which is generally the scenario for computer graphics. As shown in FIG. 3, coordinate separation logic 252 performs the separation of positive and negative components of the four normal vectors (302-308) to enable separate storage for each of the x-, y- and z-coordinates of the positive and negative coordinates of each normal vector according to, for example, a single instruction multiple data (SIMD) format.

TABLE 2

```
// Variable Declarations
__m128 plane_normals[2][3];      // +/− components separated
__m128 bmin[3];                  // [xmin, ymin, zmin]
__m128 bmax[3];                  // [xmax, ymax, zmax]
// SEPARATION OF POSITIVE AND NEGATIVE COORDINATE VALUES
// copy data
plane_normals[1][0] = plane_normals[0][0];
plane_normals[1][1] = plane_normals[0][1];
plane_normals[1][2] = plane_normals[0][2];
// '+' components
plane_normals[0][0] = _mm_and_ps(plane_normals[0][0], _mm_cmpgt_ps(plane_normals[0][0], _mm_setzero_ps( )));
plane_normals[0][1] = _mm_and_ps(plane_normals[0][1], _mm_cmpgt_ps(plane_normals[0][1], _mm_setzero_ps( )));
plane_normals[0][2] = _mm_and_ps(plane_normals[0][2], _mm_cmpgt_ps(plane_normals[0][2], _mm_setzero_ps( )));
// '−' components
plane_normals[1][0] = _mm_and_ps(plane_normals[1][0], _mm_cmple_ps(plane_normals[1][0], _mm_setzero_ps( )));
plane_normals[1][1] = _mm_and_ps(plane_normals[1][1], _mm_cmple_ps(plane_normals[1][1], _mm_setzero_ps( )));
plane_normals[1][2] = _mm_and_ps(plane_normals[1][2], _mm_cmple_ps(plane_normals[1][2], _mm_setzero_ps( )));
// PARALLEL PLANE EQUATION COMPUTATION
__m128 nplane; // 4 plane values
// Operation overloading is used to represent SIMD multiplication and addition
nplane = (plane_normals[0][0] * bmin[0]) + (plane_normals[1][0] * bmax[0]);
nplane = (plane_normals[0][1] * bmin[1]) + (plane_normals[1][1] * bmax[1]) + nplane;
nplane = (plane_normals[0][2] * bmin[2]) + (plane_normals[1][2] * bmax[2]) + nplane;
```

TABLE 2-continued

```
// TRIVIAL REJECT DETECTED
int separate = (_mm_movemask_ps(nplane) != 0xf);
```

Figure 5:
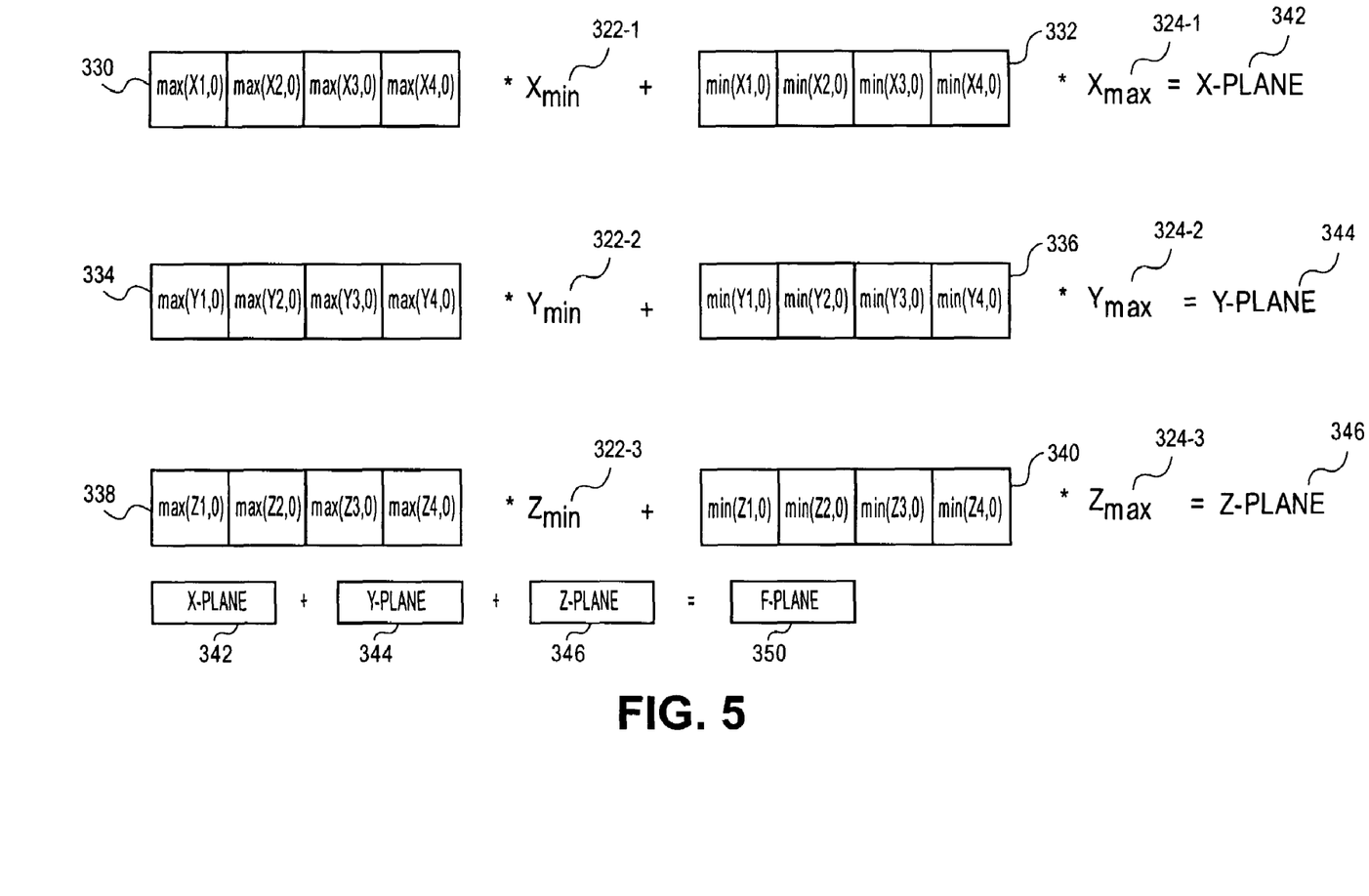
FIG. 5 is a block diagram illustrating parallel computation of a plane equation for each of a four frustum plane view, in accordance with one embodiment.

As illustrated in FIG. 5, since an AABB 320, such as shown in FIG. 4, may be represented by a pair of external vertices (minimum coordinate vertex 322 and the maximum vertex coordinate 334), the explicit selection of the coordinates of N-vertex 326, as performed by conventional frustum culling algorithms by reference to a look-up table, for example, as shown in Table 1, may be avoided by noticing that for any frustum plane (302-308), N-vertex 326 has the lower coordinate value (among the two external vertex possibilities) for any positive normal coordinate and vice versa for the negative normal direction, as shown in Table 1.

Accordingly, in one embodiment, using hardware with a four wide SIMD engine, AABB 300 can be culled against all four frustum planes (302-308) using, for example, six multiplications and six additions, as shown in Table 2. Representatively, a four wide engine provides improved performance by taking advantage of parallel computation available from SIMD registers and avoiding a table look-up to determine coordinates of N-vertex 326 or a P-vertex 328.

Culling of an AABB, such as AABB 320 against a frustum view, such as frustum view 300, as shown in FIG. 3, in accordance with one embodiment, is described with reference to the pseudo code illustrated in Table 2 and the computation shown in FIG. 5. Representatively, as illustrated in Table 2, variable declarations are provided to enable separate storage of negative normal coordinates and positive normal coordinates, as well as minimum coordinate vertex 322 and maximum coordinate 324 of AABB 320, as shown in the variables declaration section.

Representatively, assuming that plane_normals[0] contains four normal vectors (all x-coordinates in plane_normals [0][0], all y-coordinates in plane_normals[0][1] and all z-coordinates in plane_normals[0][2]), as shown in SEPARATION OF POSITIVE AND NEGATIVE COORDINATE VALUES selection, the pseudo code shown in Table 2, positive and negative normal coordinates are split such that the variable plane_normals[0] contains all positive coordinates and the variable plane_normals[1] contains all negative coordinates. In one embodiment, the separation of negative and positive coordinate normals, as shown in Table 2, is computed once per set-up stage and then reused during the rendering process.

Referring to FIG. 5, as illustrated, single instruction multiple data (SIMD) register 330 stores the positive x-coordinate values $(\max(0,x_1), \max(0,x_2), \max(0,\max_3), \max(0,x_4))$ for the four normals of frustum planes 302-308, while SIMD register 332 stores the negative x-coordinates $(\min(0,x_1), \min(0,x_2), \min(0,x_3), \min(0,x_4))$ for frustum planes 302-308. Representatively, the positive y-coordinates $(\max(y_1,0), \max(y_2,0), \max(y_3,0), \max(y_4,0))$ of normal vector are stored in SIMD register 334, while the negative y-coordinates $(\min(y_1,0), \min(y_2,0), \min(y_3,0) \min(y_4,0))$ of normal vectors 302-308 are stored in SIMD register 336. Finally, the positive z-coordinates $(\max(z_1,0), \max(z_2,0), \max(z_3,0), \max(z_4,0))$ of normal vector 302-308 are stored in SIMD register 338, while the negative z-coordinates $(\min(z_1,0), \min(z_2,0), \min(z_3,0), \min(z_4,0))$ of normal vectors 302-308 are stored in SIMD register 340.

By performing such separation of the negative and positive x-, y- and z-coordinates normal vectors 302-308, coordinates of N-vertex 322 of AABB 320 may be implicitly determined to enable parallel computation for culling, for example, AABB 320 (FIG. 4), against frustum planes 302-308, as indicated by PARALLEL PLANE EQUATION COMPUTATION section of Table 2. This is also further illustrated in FIG. 5.

As illustrated with reference to FIGS. 4 and 5, values of minimum coordinate vertex 322 (Xmin 322-1, Ymin 322-2, Zmin 322-3) of AABB 320 (FIG. 3) are multiplied with the corresponding positive x-coordinates contained in SIMD register 330, the positive y-coordinates contained in SIMD register 344 and the positive z-coordinates contained in SIMD register 338. Likewise, the maximum coordinate values (Xmax 324-1, Ymax 324-2, Zmax 324-3) of AABB 320 (FIG. 3) are multiplied with the negative x-coordinates contained in SIMD register 344, negative y-coordinates contained in SIMD register 336 and the negative z-coordinates contained in SIMD register 340, respectively. In one embodiment, such parallel multiplications are respectively summed to generate X-plane SIMD register value 342, Y-plane register value 344 and Z-plane register value 346. Representatively, SIMD addition of X-plane value 342, Y-plane value 344 and Z-plane value 346 is performed to generate final plane (F-plane) SIMD register value 350.

As described herein, results from SIMD multiplication of the positive x-coordinate values contained in SIMD register 330 with Xmin value 322-1 may be referred to herein as "positive X-plane SIMD register values," whereas results from multiplication of the minimum x-coordinate values within SIMD register by Xmax 324-1 may be referred to herein as "negative X-plane SIMD register values." As further described herein, results from multiplication of the positive y-coordinate values in SIMD register 334 by Ymin value 322-2 may be referred to herein as "positive Y-plane SIMD register values," whereas results from multiplication of the negative y-coordinate values contained within SIMD register 336 by Ymax value 324-2 may be referred to herein as "Y-plane SIMD register values." As further described herein, multiplication of the positive z-coordinate register values contained within SIMD register 338 by Zmin 322-3 may be referred to herein as "positive Z-plane SIMD register values," whereas the result from multiplication of the negative z-coordinates of each normal vector contained within SIMD register 340 by Zmax 324 may be referred to herein as "negative Z-plane SIMD register values." Collectively, the positive X-plane SIMD register values, the positive Y-plane SIMD register values and the positive Z-plane SIMD register values may be collectively referred to herein as "positive plane (P-plane) SIMD register values." As further described herein, the negative X-plane SIMD register values, the negative Y-plane SIMD register values and the negative Z-plane SIMD register values may be collectively referred to herein as "negative plane (N-plane) SIMD register values."

Accordingly, if any of the N-plane values 350 is positive, then frustum view 300 and AABB 320 are separated by an appropriate plane. In other words, as indicated by the TRIVIAL REJECT DETECTED section of Table 2, if the variable "separate" is equal to one, then frustum view 300 and AABB 320 do not intersect and a trivial reject is detected. As indicated above, such implicit selection enables the set-up of such equations early in the graphics pipeline and thus avoids the table look-up process, as performed by conventional frustum culling algorithms. Procedural methods for implementing the above-described embodiments are now provided.

Operation

Figure 6:
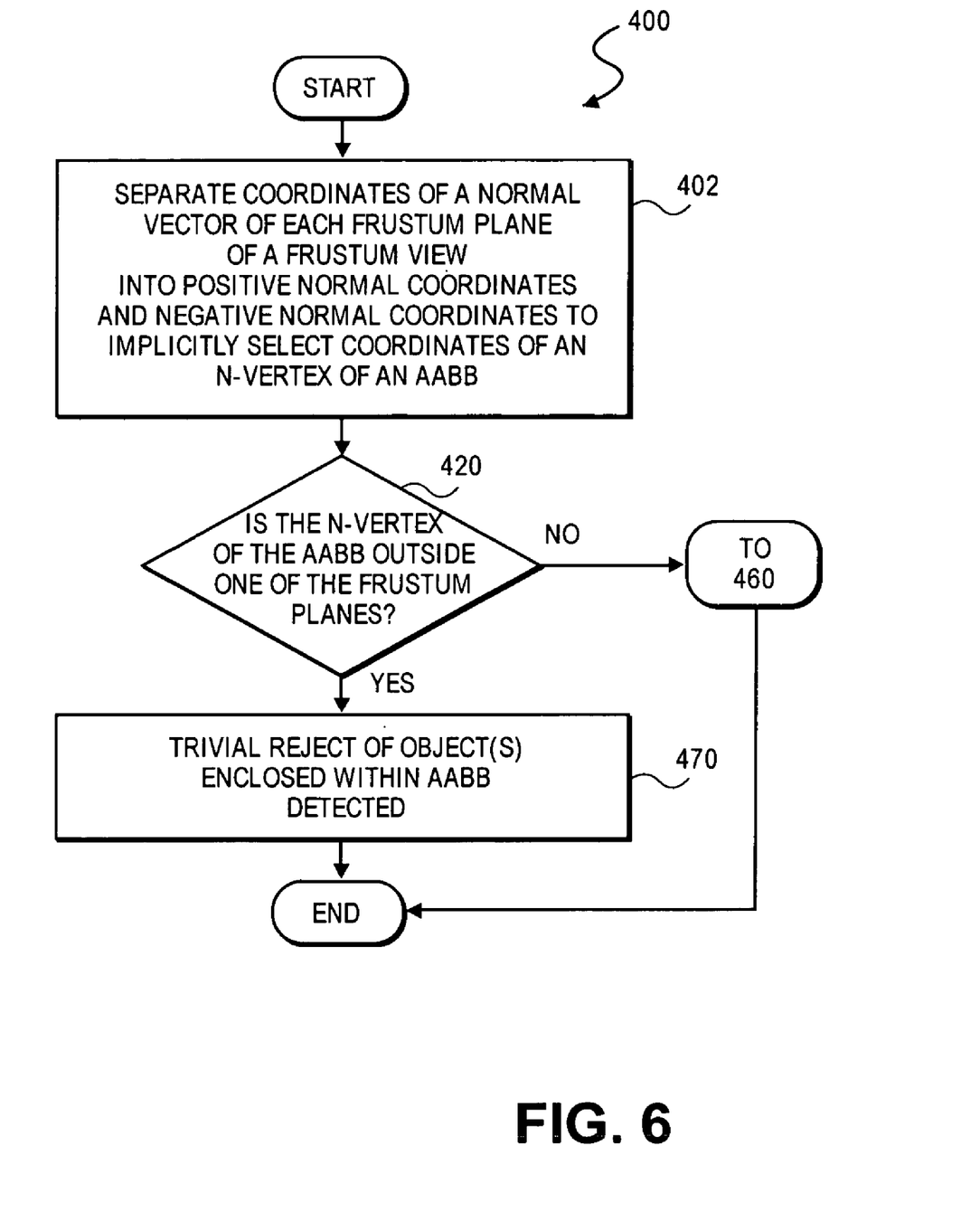
FIG. 6 is a flowchart illustrating a method for implicit selection of coordinates of a negative vertex (N-vertex) of an AABB to enable culling of the AABB against a frustum view, in accordance with one embodiment.

Turning now to FIG. 6, the particular methods associated with various embodiments are described in terms of computer software and hardware with reference to a flowchart. The methods to be performed by a computing device (e.g., a graphics controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flowchart illustrating a method 400 for an improved frustum culling algorithm, in accordance with one embodiment. In the embodiments described, examples of the described embodiments will be made with reference to FIGS. 1-5 and Tables 1 and 2. However, the described embodiments should not be limited to the examples provided to limit the scope provided by the appended claims.

Referring again to FIG. 6, at process block 402, coordinates of a normal vector of each of frustum plane of a frustum view are separated into positive normal coordinates and negative normal coordinates, for example, as shown in FIGS. 4 and 5. In one embodiment, the separation of positive normal coordinates and negative normal coordinates enables frustum culling logic 250 to implicitly select coordinates of a negative vertex (N-vertex) of an axis-aligned bounded box (AABB) (See, FIG. 2.).

For example, as illustrated in FIGS. 4 and 5, values of minimum coordinate vertex 322 of AABB 320 are multiplied with corresponding positive normal coordinates contained in SIMD register 330, SIMD register 344 and SIMD register 338. Likewise, values of maximum coordinate vertex 324 of AABB 320 are multiplied with corresponding negative normal coordinates contained in SIMD register 332, SIMD register 336 and SIMD register 340. As indicated above, implicit selection of the coordinates of an N-vertex of AABB enables the determination of a "trivial reject" of objects enclosed by the AABB. In one embodiment, the ability to detect a trivial reject based on implicitly selected coordinates of the N-vertex provides an improved frustum culling algorithm and to avoid the expensive table look-up process performed by conventional frustum culling algorithms.

Referring again to FIG. 6, at process block 420, it is determined whether the N-vertex of the AABB is outside at least one frustum plane. In one embodiment, a determination that an N-vertex of an AABB is outside one frustum plane provides a "trivial reject" of objects enclosed within the AABB, such that such objects are outside of the frustum view and therefore does not require rendering, as shown at process block 470. Hence, for example, as shown in FIG. 1, data associated with the trivial reject is not provided to render engine 200 to enable rendering via display 144.

Figure 7:
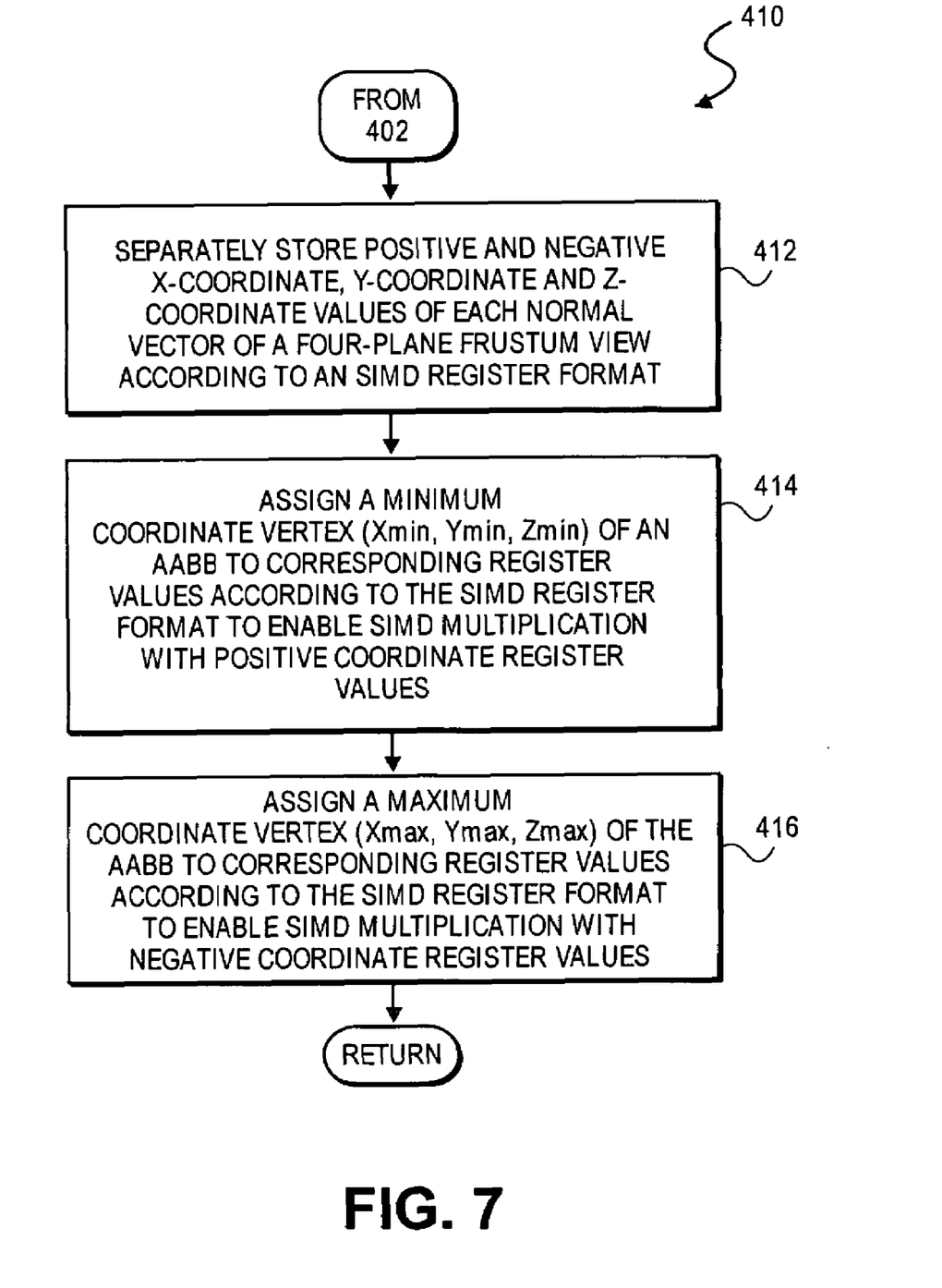
FIG. 7 is a flowchart illustrating a method for separating coordinates of a normal vector of each frustum plane of a frustum view to enable implicit selection of the coordinates of a negative vertex of an AABB, in accordance with one embodiment.

FIG. 7 is a flowchart illustrating a method 410 for separating coordinates of a normal vector of each of frustum planes into positive and negative normal coordinates, in accordance with one embodiment. At process block 412, positive and negative x-coordinate, y-coordinate and z-coordinate values of each normal vector of a four plane frustum view are separately stored according to a single instruction multiple data (SIMD) format, by example, as shown in FIGS. 4 and 5. Once separated, at process block 414, values of (Xmin, Ymin, Zmin) a minimum coordinate vertex of an AABB are assigned to corresponding register values according to the SIMD register format, for example, as shown in FIG. 5, to enable multiplication with the positive coordinate SIMD register values.

At process block 416, values (Xmax, Ymax, Zmax) of a maximum coordinate vertex of the AABB are assigned to corresponding SIMD register values of each normal vector, as shown in FIG. 5, to enable multiplication with the negative coordinate SIMD register values. Following such assignment, an equation for computing or culling objects contained within an AABB against a frustum view may be performed, for example, as described with reference to FIG. 8.

Figure 8:
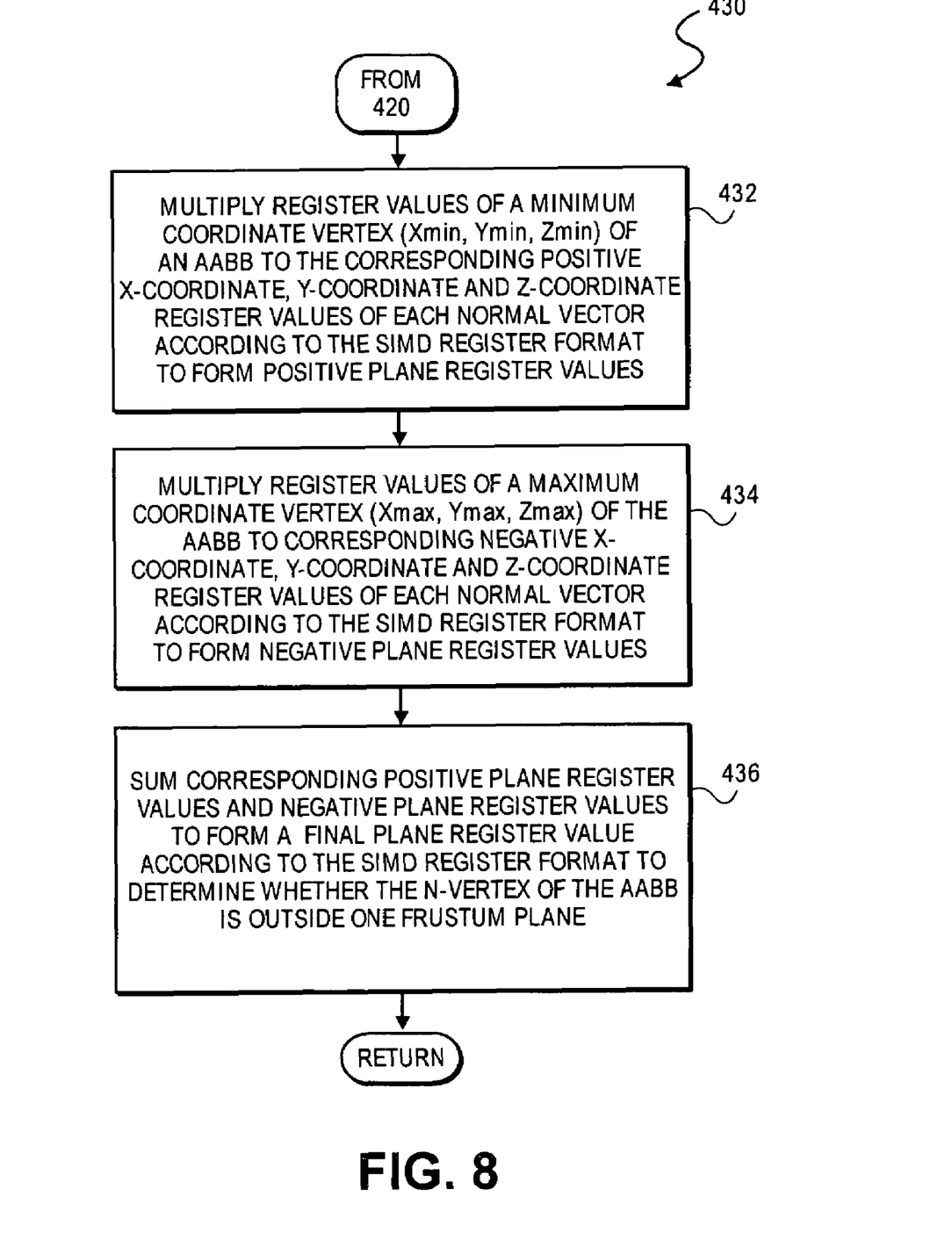
FIG. 8 is a flowchart illustrating a method for parallel computation of a plane equation for each frustum plane to cull a negative vertex of an AABB, in accordance with one embodiment.

FIG. 8 is a flowchart illustrating a method 430 for determining whether an N-vertex of an AABB is outside at least one frustum plane of a frustum view, in accordance with one embodiment. At process block 432, x-, y- and z-coordinate values of a minimum coordinate vertex of the AABB are multiplied with corresponding positive x-coordinate, y-coordinate and z-coordinate values of each normal vector to form P-plane SIMD register values. Likewise, at process block 434, coordinates of a maximum coordinate vertex of the AABB are multiplied with corresponding negative x-coordinate, y-coordinate and z-coordinate values of each normal vector to form N-plane SIMD register values. At process block 436, a sum of the corresponding P-plane SIMD register values and the N-plane SIMD register values is performed to form a final plane (F-plane) SIMD register value. In one embodiment, components of the F-plane SIMD register value may be used to determine whether the N-vertex of the AABB is outside at least one frustum plane.

Such format is illustrated with reference to FIG. 5 and Table 2 under the PARALLEL PLANE EQUATION COMPUTATION section of Table 2. According to such computation of such plane equation, it is determined the N-vertex of the AABB is outside one frustum plane, to, for example, determine a trivial reject for objects enclosed by the AABB.

Figure 9:
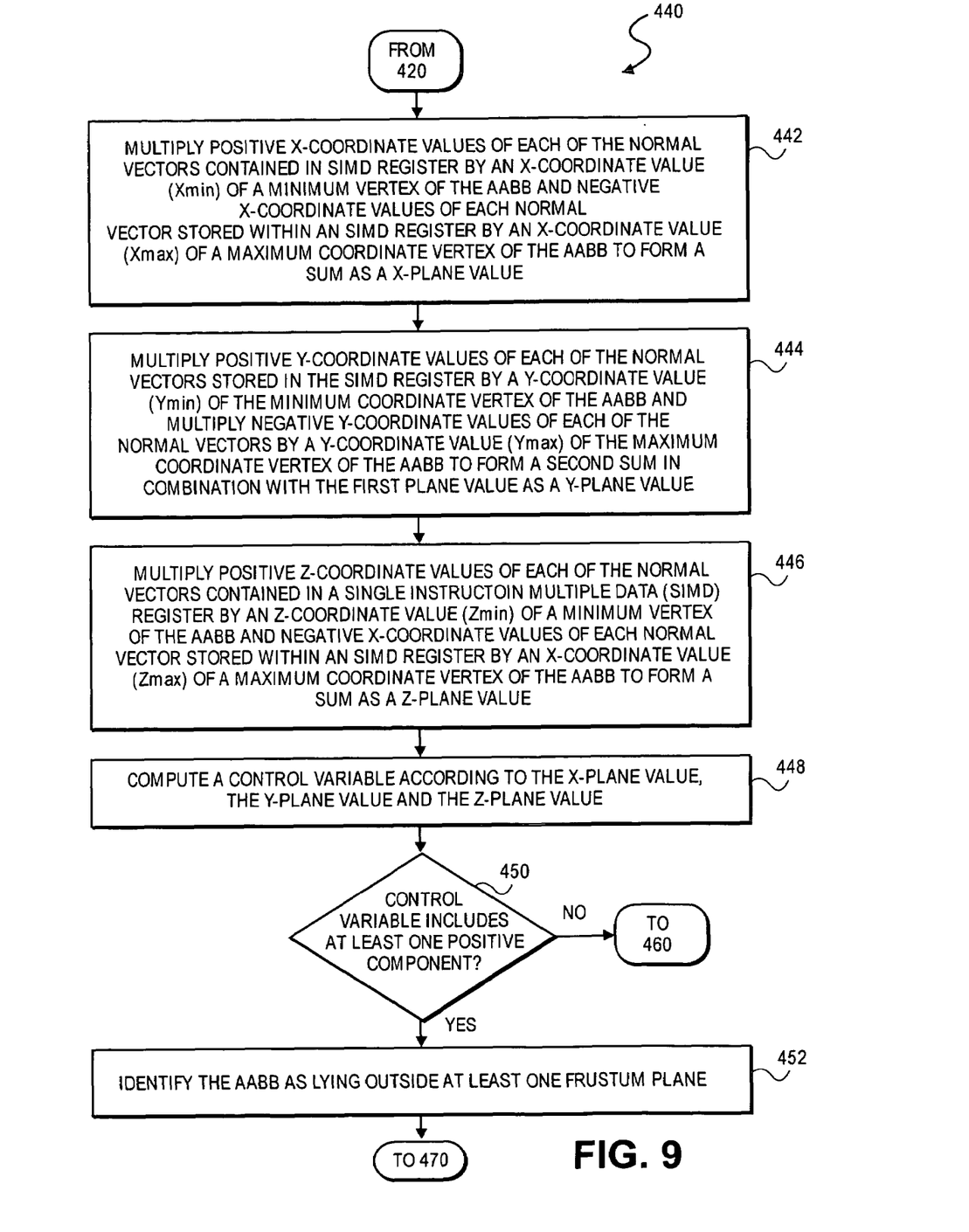
FIG. 9 is a flowchart illustrating a method for a parallel computation of a plane equation for each event frustum planes, in accordance with one embodiment.

FIG. 9 is a flowchart illustrating a method 440 for performing a parallel computation of frustum planes to cull an AABB against each of the frustum planes, in accordance with one embodiment. At process block 442, a parallel computation of the multiplication of positive x-coordinate values by an x-coordinate (Xmin) of the minimum vertex of the AABB 320 is performed in parallel with the computation and multiplication of an Xmax value 324-1 of the AABB 320 with the negative x-coordinates of each normal vector to form an X-plane value (see FIG. 5). At process block 444, y-coordinate values of each normal vector are multiplied in parallel by a Ymin value 322-1 of the AABB 320 and summed with negative y-coordinate values of each normal vector multiplied in parallel by Ymax value 324-2 of the AABB 320 to form a Y-plane value (see FIG. 5).

At process block 446, positive z-coordinates of each normal vector are multiplied in parallel by Zmin value 322-1 of AABB 320 and summed with negative z-coordinate values multiplied in parallel by Zmax value 324-3 of the AABB 320 to form a Z-plane value (see FIG. 5). At process block 448, a control variable is computed according to the X-plane value, the Y-plane value and the Z-plane value computed at process blocks 442-446. In one embodiment, the control variable refers to an SIMD register, which includes a component value for each frustum plane of a frustum view. At process block 450, it is determined whether at least one component value of the control variable is positive. When such is the case, at process block 452, the AABB is identified as lying outside the frustum plane corresponding to component value of the control variable. Otherwise, control flow branches 460 is shown in FIG. 10.

Figure 10:
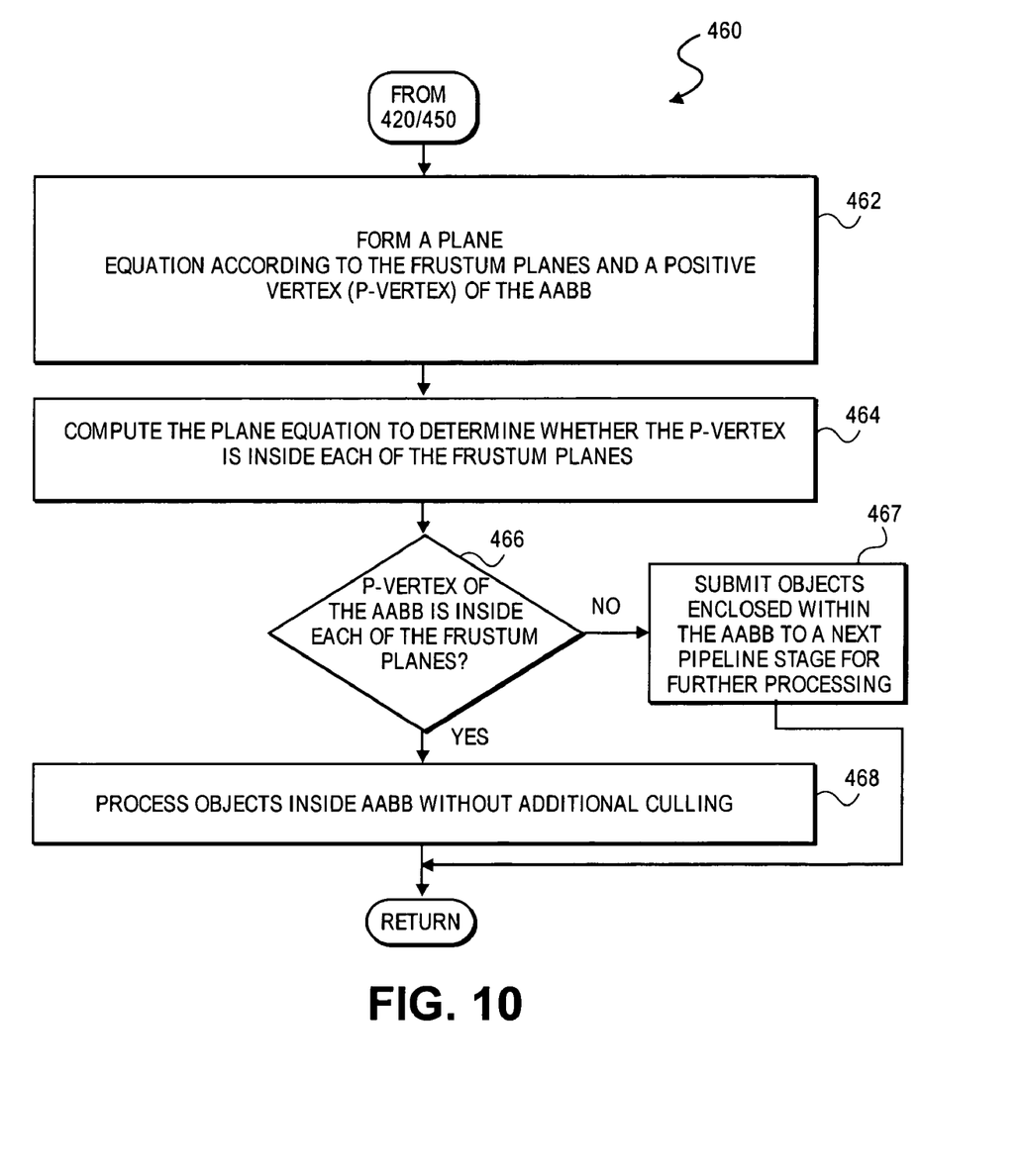
FIG. 10 is a flowchart illustrating a method for culling a positive vertex (P-vertex) of an AABB, in accordance with one embodiment.

FIG. 10 is a flowchart illustrating a method 460 for further culling an AABB against each frustum plane to determine whether objects enclosed by the AABB should be rendered to a display screen. In other words, for objects that are outside of the frustum view, such objects may be excluded from the rendering process based on trivial reject, whereas objects that intersect the frustum view are required to be rendered and therefore displayed as part of a current screen.

Referring again to FIG. 10, at process block 462, vertex 324 of the AABB 320 are multiplied with the positive normal plane equation is formed according to the frustum planes and a positive vertex (P-vertex) of the AABB. Once formed, at process block 464, the plane equation is computed to determine whether the P-vertex of the AABB is inside each of the frustum planes. Once computed, at process block 466, it is determined whether the P-vertex is inside each of the frustum planes. When such is detected, at process block 468, all objects contained within the AABB are rendered without further culling.

In one embodiment, an AABB is identified as completely inside a frustum view if the P-vertex of the AABB is inside all frustum planes, as determined at process block 466. However, when it cannot be determined that the P-vertex is inside each of the frustum planes, at process block 467, objects enclosed within the AABB may be submitted to a next pipeline stage for further processing. In accordance with such further processing, some objects inside the AABB can be outside the frustum view, whereas additional objects may be inside or intersect with the frustum view. Accordingly, in the embodiments described, a trivial reject, based on a determination that the N-vertex of an AABB is outside at least one frustum plane, as well as the determination that a P-vertex of an AABB is inside each of the Frustum planes, provide further simplification to a rendering pipeline, for example, as shown in FIG. 2, by either completely excluding or completely including objects enclosed within an AABB for processing within a rendering pipeline.

In the embodiments described above, the separation of normal components into positive and negative variables enables the explicit selection of either an N-vertex or a P-vertex of an AABB. As shown Table 2, eleven operations are required to implicitly select the coordinate values of the N-vertex and compute all four plane values (for each frustum plane). As indicated by such calculation, an N-plane value shown in Table 2 contains four values. In one embodiment, if any one of these values is positive, then the frustum and the box are separated by an appropriate plane.

In one embodiment, an operation is provided to determine a parallel computation, such that, as shown in Table 2, if the variable separate is equal to one, the frustum and the AABB do not intersect and hence a trivial reject is detected. Accordingly, rather than performing an expensive table look-up, in one embodiment, frustum culling logic 250, for example, as shown in FIGS. 1-3 and described with reference to Table 2 and FIGS. 4 and 5 may avoid a runtime look-up of coordinates of an N-vertex from a look-up table, as performed by conventional frustum culling algorithms and hence avoid the processor-to-memory bottleneck, which reduces the efficiency of such conventional frustum culling algorithms.

Figure 11:
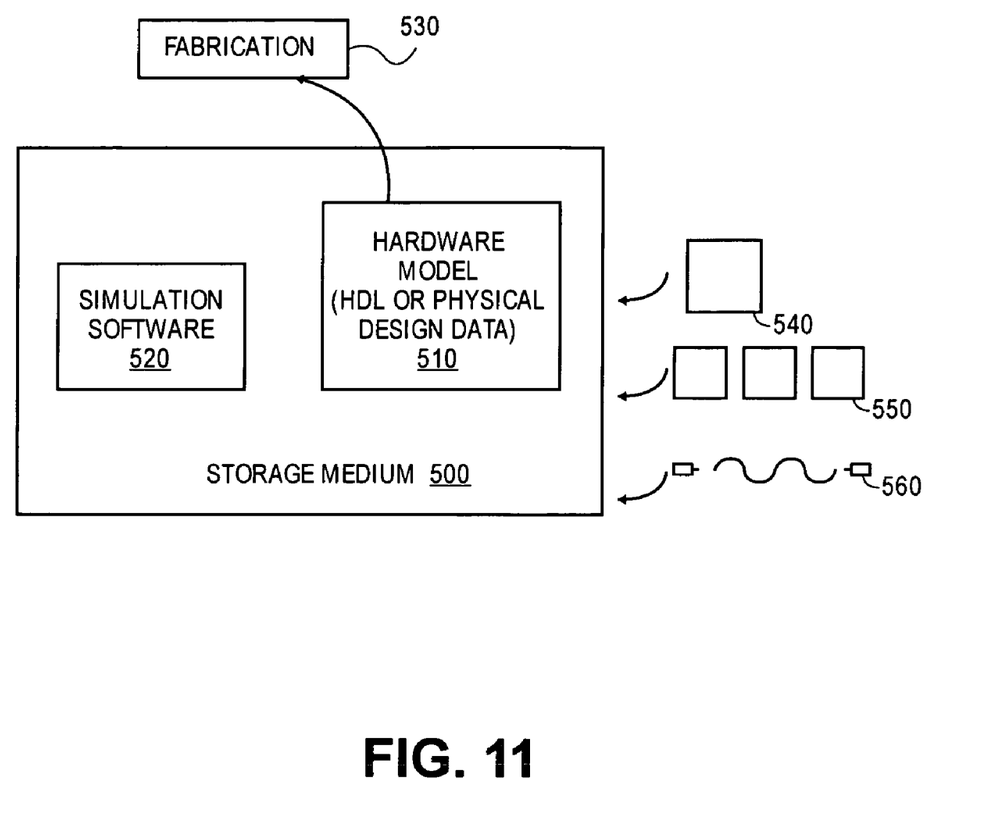
FIG. 11 is a block diagram illustrating various design representations or formats for simulation, emulation and fabrication of a design using the disclosed techniques.

FIG. 11 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
    separating coordinates of a normal vector of each frustum plane of a frustum view into positive normal coordinates and negative normal coordinates to implicitly select coordinates of a negative vertex (N-vertex) of an axis-aligned bounded box (AABB);
    eliminating one or more objects enclosed within at least one AABB if the N-vertex of the AABB is outside at least one frustum plane to reduce an amount of objects provided for rendering;
    rendering one of more objects enclosed within at least one AABB if the N-vertex is inside each of the frustum planes; and
    displaying one or more rendered objects via a display.

2. The method of claim 1, wherein separating the coordinates further comprises:
    separately storing positive and negative X-coordinate, Y-coordinate and Z-coordinate values of each normal vector of a four-plane frustum view as register values according to a single instruction multiple data (SIMD) register format.

3. The method of claim 1, wherein separating the coordinates further comprises:
    assigning an X-coordinate, Y-coordinate and Z-coordinate value of a minimum coordinate vertex (Xmin, Ymin, Zmin) of the AABB to corresponding register values according to the single instruction multiple data (SIMD) register format; and
    assigning an X-coordinate, Y-coordinate and Z-coordinate value of a maximum coordinate vertex (Xmax, Ymax, Zmax) of the AABB to corresponding register values according to the SIMD register format to determine whether the N-vertex of the AABB is outside at least one frustum plane.

4. The method of claim 3, further comprising:
    computing, in parallel for each frustum plane, a plane equation according to the corresponding Xmin, Ymin, Zmin register values, the corresponding Xmax, Ymax, Zmax register values and separately stored positive and negative X-coordinate, Y-coordinate and Z-coordinate register values of each frustum plane according to the SIMD format to determine whether the N-vertex of the AABB is outside at least one frustum plane.

5. The method of claim 1, wherein separating the coordinates further comprises:
    multiplying positive X-coordinate values of each of the normal vectors contained in a single instruction multiple data (SIMD) register by an X-coordinate value (Xmin) of a minimum vertex of the AABB and negative X-coordinate values of each normal vector stored within an SIMD register by an X-coordinate value (Xmax) of a maximum coordinate vertex of the AABB to form a first sum as an X-plane value;
    multiplying the positive Y-coordinate values of each of the normal vectors stored in the SIMD register by a Y-coordinate value (Ymin) of the minimum coordinate vertex of the AABB and multiplying negative Y-coordinate values of each of the normal vectors by a Y-coordinate value (Ymax) of the maximum coordinate vertex of the AABB to form a second sum as a Y-plane value;
    multiplying the positive Z-coordinate values of each of the normal vectors stored within a SIMD register by a Z-coordinate value (Zmin) of the minimum coordinate vertex of the AABB and multiplying negative Z-coordinate values of each of the normal vectors by a Z-coordinate value (Zmax) of the maximum coordinate vertex of the AABB to form a third sum as a Z-plane value;
    computing a final plane value as a sum of the X-, Y- and Z-plane values; and
    identifying the AABB as lying outside at least one frustum plane if the final plane value includes at least one positive component for the at least one frustum plane.

6. The method of claim 1, wherein separating the coordinates further comprises:
    forming a plane equation according to the positive normal coordinate and negative normal coordinate register values and the implicitly selected coordinates of the N-vertex according to a single instruction multiple data (SIMD) register format; and
    computing the plane equation to determine whether the N-vertex of the AABB is outside at least one of the frustum planes.

7. The method of claim 1, further comprising:
    computing a plane equation to determine whether a positive (P-vertex) of the AABB is inside each of the frustum planes if the N-vertex of the AABB is inside at least one of the frustum planes to reduce the amount of objects provided for rendering.

8. The method of claim 7, further comprising:
    rendering one or more objects enclosed within the AABB if the P-vertex of the AABB is inside each of the Frustum planes.

9. The method of claim 7, wherein computing the plane equation further comprises:
    multiplying corresponding to a single instruction multiple data (SIMD(register values of a minimum coordinate vertex of the AABB to SIMD register values of the negative normal coordinates to form a first sum as a negative plane (N-plane) SIMD register value; and
    multiplying SIMD register values of a maximum coordinate vertex of the AABB to SIMD register values of the positive normal coordinates to form a second sum as a positive plane (P-plane) SIMD register value;
    summing the N-plane value and the P-plane value to form a final plane SIMD register value; and
    identifying the AABB as lying outside at least one frustum plane if the final plane SIMD register value includes at least one positive component for the at least one frustum plane.

10. A computer readable storage medium, having instructions stored thereon wherein the instructions, when accessed, cause the computer to perform a method comprising:
    separating coordinates of a normal vector of each -frustum plane of a frustum view into positive normal coordinate and negative normal coordinate register values according to a single instruction multiple data (SIMD) register format;

forming a plane equation according to the positive normal coordinate and negative normal coordinate register values and an implicitly selected negative vertex (N-vertex) of an axis-aligned bounded box (AABB) according to the SIMD register format; and computing the plane equation to determine whether the N-vertex of the AABB is outside each of the frustum planes.

11. The computer of claim 10, wherein separating coordinates further results in the computer performing a method comprising:

separately storing positive and negative X-coordinate values, Y-coordinate values and Z-coordinate values of each normal vector of a four plane frustum view according to a single instruction multiple data (SIMD) format.

12. The computer of claim 10, wherein forming the plane equation further results in the computer performing a method comprising:

assigning an X-coordinate, Y-coordinate and Z-coordinate value of a minimum coordinate vertex of the AABB to corresponding register values according to the SIMD register format; and assigning an X-coordinate, Y-coordinate and Z-coordinate value of a maximum coordinate vertex of the AABB to corresponding negative X-coordinate, Y-coordinate and Z-coordinate register values according to the SIMD register format.

13. The computer of claim 10, wherein computing the plane equation further results in the computer performing a method comprising:

multiplying an X-coordinate value (Xmin) of the minimum coordinate vertex of the AABB to each positive X-coordinate of each normal vector to form a positive X-plane SIMD register value;

multiplying a Y-coordinate value (Ymin) of the minimum coordinate vertex to each positive Y-coordinate of each normal vector to form a Y-plane SIMD register value;

multiplying a Z-coordinate value (Zmin) of the minimum coordinate vertex to each positive Z-coordinate of each normal vector to form a Z-plane SIMD register value;

multiplying an X-coordinate value (Xmax) of the maximum coordinate vertex of the AABB to each negative X-coordinate of each normal vector to form a negative X-plane SIMD register value;

multiplying a Y-coordinate value (Ymax) of the maximum coordinate vertex to each negative Y-coordinate of each normal vector to form a negative Y-plane SIMD register value;

multiplying each Z-coordinate value (Zmax) of the maximum coordinate vertex to each negative Z-coordinate of each normal vector to form a negative Z-plane SIMD register value; and summing the positive X-plane SIMD register value, the negative X-plane SIMD register value, the positive Y-plane SIMD register value, the negative Y-plane SIMD register value, the positive Z-plane SIMD register value, and the negative Z-plane SIMD register value according to the SIMD register format to form a final plane SIMD register value.

14. The computer of claim 10, wherein computing the plane equation further results in the computer performing a method comprising:

multiplying positive coordinate SIMD register values of each of the normal vectors by coordinate register values of a minimum coordinate vertex of an axis-aligned bounded box (AABB) to form a first sum as a negative plane (N-plane) SIMD register value;

multiplying negative coordinate SIMD register values of each of the normal vectors by coordinate register values of the maximum coordinate vertex of the AABB to form a negative plane (N-plane) SIMD register value;

summing the N-plane value and the P-plane value to form a final plane SIMD register value; and identifying the AABB as lying outside at least one frustum plane if the SIMD register value includes at least one positive component for the at least one frustum plane.

15. A system comprising:

a processor including at least two processor cores;

a graphics controller coupled to the processor, the graphics controller including frustum culling logic to separate coordinates of a normal vector of each frustum plane of a frustum view into positive normal coordinates and negative normal coordinates to implicitly select coordinates of one of a negative vertex (N-vertex) and a positive vertex (P-vertex) of an axis-aligned bounded box (AABB) and to eliminate one or more objects enclosed within at least one AABB if the N-vertex of the AABB is outside at least one of the frustum planes to reduce an amount of objects provided for rendering;

a render engine to render one or more objects enclosed within at least one AABB if the N-vertex of the AABB is inside each of the frustum planes; and a display to display one or more rendered objects.

16. The system of claim 15, wherein the frustum culling logic is further to multiply corresponding values of a minimum coordinate vertex of the AABB to the positive normal coordinates and to multiply corresponding values of a maximum coordinate vertex of the AABB to the negative normal coordinates to form a plane equation according to the frustum planes and the N-vertex of the AABB and to compute the plane equation to determine whether the N-vertex of the AABB is outside one of the Frustum planes.

17. The system of claim 15, wherein the graphics controller further comprises:

a memory controller to couple a memory to the graphics controller.

* * * * *